(12) United States Patent
Rezeanu

(10) Patent No.: US 9,439,270 B2
(45) Date of Patent: Sep. 6, 2016

(54) DIGITAL COMMUNICATION RECEIVER INTERFACE CIRCUIT FOR LINE-PAIR WITH DUTY CYCLE IMBALANCE COMPENSATION

(71) Applicant: KONINKLIJKE PHILIPS N.V., Eindhoven (NL)

(72) Inventor: Stefan-Cristian Rezeanu, Collierville, TN (US)

(73) Assignee: KONINKLIJKE PHILIPS N.V., Eindhoven (NL)

(*) Notice: Subject to any disclaimer, the term of this patent is extended or adjusted under 35 U.S.C. 154(b) by 0 days.

(21) Appl. No.: 14/436,716

(22) PCT Filed: Oct. 11, 2013

(86) PCT No.: PCT/IB2013/059314
§ 371 (c)(1),
(2) Date: Apr. 17, 2015

(87) PCT Pub. No.: WO2014/060922
PCT Pub. Date: Apr. 24, 2014

(65) Prior Publication Data
US 2016/0174340 A1 Jun. 16, 2016

Related U.S. Application Data

(60) Provisional application No. 61/714,934, filed on Oct. 17, 2012.

(51) Int. Cl.
*H05B 37/00* (2006.01)
*H05B 37/02* (2006.01)
(52) U.S. Cl.
CPC .................. *H05B 37/0254* (2013.01)
(58) Field of Classification Search
CPC ............ H05B 37/0254; H05B 37/0272

USPC .................................................. 315/200 R
See application file for complete search history.

(56) References Cited

U.S. PATENT DOCUMENTS

| | | | | |
|---|---|---|---|---|
| 8,203,277 | B2* | 6/2012 | Grotkowski | H05B 33/0815 315/155 |
| 2009/0003417 | A1* | 1/2009 | Boeckle | H05B 37/0254 375/211 |
| 2011/0135098 | A1 | 6/2011 | Kuhr et al. | |
| 2013/0320875 | A1* | 12/2013 | Saes | H05B 33/0818 315/224 |
| 2015/0076994 | A1* | 3/2015 | Rezeanu | H05B 37/0254 315/155 |
| 2015/0223306 | A1* | 8/2015 | Rezeanu | H05B 37/0254 315/200 R |

FOREIGN PATENT DOCUMENTS

| | | |
|---|---|---|
| DE | 10113367 C1 | 1/2003 |
| WO | 2010043263 A1 | 4/2010 |
| WO | 2011135098 A1 | 11/2011 |

* cited by examiner

*Primary Examiner* — Jason M Crawford
(74) *Attorney, Agent, or Firm* — Meenakshy Chakravorty

(57) ABSTRACT

A circuit (200) includes: a diode bridge (210) having polarity-independent input terminals for coupling to a DALI bus, and having positive and negative output terminals, wherein the diode bridge receives a receive signal from the DALI bus; a galvanic isolation device (220) having an input for receiving the receive signal from the diode bridge, and an output for outputting the receive signal galvanically isolated from the diode bridge and the DALI bus; a receive signal threshold reference device (235) for setting a threshold voltage for the galvanic isolation device to respond to the receive signal; an amplifier (280) for receiving the galvanically isolated receive signal from the galvanic isolation device and outputting a binary digital signal via a low pass filter (290); and a first duty cycle control device (230, 270) for adjusting the timing of rising edges of the galvanically isolated receive signal with respect to its falling edges.

20 Claims, 7 Drawing Sheets

DIGITAL COMMUNICATION RECEIVER INTERFACE CIRCUIT FOR LINE-PAIR WITH DUTY CYCLE IMBALANCE COMPENSATION

CROSS-REFERENCE TO PRIOR APPLICATIONS

This application is the U.S. National Phase application under 35 U.S.C. §371 of International Application No. PCT/IB2013/059314, filed on Oct. 11, 2013, which claims the benefit of U.S. Provisional Patent Application No. 61/714,934, filed on Oct. 17, 2012. These applications are hereby incorporated by reference herein.

TECHNICAL FIELD

The present invention is directed generally to a digital communication interface, and more particularly to an interface circuit for interfacing a device with a line-pair such as a Digital Addressable Lighting Interface (DALI).

BACKGROUND

In recent years, new or more stringent demands have been imposed on lighting systems, such as increased requirements for energy conservation, and the need to accommodate an increasing variety of different types of lighting units which employ different types of light sources (e.g., incandescent, fluorescent, light emitting diode, etc.) with different driving requirements, with different types of lighting units often being deployed within a same building or even the same room. These demands have driven needs for more options and flexibility in the control of the lighting units within a facility. These needs, in turn, have led to the development and installation of lighting networks within many facilities.

In particular, the lighting industry has developed the Digital Addressable Lighting Interface (DALI) standard for digital communications between the individual components of a lighting system which are connected in a lighting network. A DALI network may include one or more DALI control devices and one or more DALI slave devices. A wide variety of different DALI devices from different manufacturers can be connected together and integrated into a lighting system. This provides a high level of flexibility in configuring a lighting system while being assured of interoperability between all of the devices. Control and address capabilities allow a DALI compliant lighting system to individually control the light level of each of the luminaries as well as easily controlling light levels for groups of luminaries.

A group of DALI devices may be connected together via a two-wire differential control/data bus referred to as a DALI bus (which may sometimes also be referred to as a DALI loop or DALI network). DALI messages communicated between DALI devices via the DALI bus are serial data streams and comply with a bi-phase coding, Manchester IEEE 802.3, in which the bit transitions occur between two states or voltage levels, which are typically 16 volts (H) and 0 volts (L). Each DALI device includes a corresponding DALI interface for connecting the device to the DALI bus. To maintain interoperability between different DALI devices from different manufacturers, the DALI standard imposes requirements on the DALI interfaces of DALI control devices and DALI slave devices to ensure DALI device compatibility.

FIG. 1 illustrates the voltage range relationships for the differential two-wire line (a "line-pair") of a DALI bus.

Each DALI device receives information by determining the voltage changes of a received signal on the DALI bus representing the bit values of the serial data stream, and transmits information by either not clamping or clamping (shorting) the voltage across the two-wire DALI bus. A power source is usually incorporated in the master controller for the DALI bus, providing the necessary voltage level on the DALI bus.

A DALI interface conditions a received signal from the DALI bus and conveys a corresponding binary digital signal to one or more components that use the binary digital signal (e.g., a microcontroller (MCU) that also performs the necessary decoding of the binary digital signal) via a galvanic isolation means that provides a required galvanic isolation between the DALI bus and the MCU.

For optimal decoding, it is desirable to have the duty cycle of a binary digital signal output by a DALI interface to be as close as possible to 50% when it reaches the MCU or other decoder, to ensure that the serial data conveyed by the binary digital signal is accurately decoded and detected in the presence of noise. However, the DALI standard (IEC 62386-101) only imposes limits on the rise and fall transition times as well as the duty cycle (i.e., low and high durations) of the signal present on the DALI bus, and it is left to the DALI interface to make sure that the duty cycle of the signal that is provided to the input of the MCU/decoder is not overly distorted by one or more components of the DALI interface.

To address these requirements, several different communication interface circuits have been developed. In particular, examples of DALI interface circuits are disclosed in: U.S. Patent Application Publication 2004/0225811; U.S. Patent Application Publication 2005/0152439; U.S. Patent Application Publication 2008/0143402; and U.S. Patent Application Publication 2009/0003417.

However, each of these communication interface circuits has certain disadvantages or limitations pertaining to complexity, cost, and/or performance.

Thus, it would be desirable to provide a communication interface circuit which can provide flexible control of the duty cycle and which can maintain a duty cycle of a received signal to be within a specified range, as tight as possible around the ideal 50% value, while taking into account variations in the specified performance of electrical components of the interface circuit. It would further be desirable to provide such a communication interface circuit which can provide flexible control of the rise and fall times of the edge transitions of a signal received from a DALI bus.

SUMMARY

The present disclosure is directed to inventive methods and apparatus for interfacing a device to a line-pair for digital communication, and more particularly to an interface circuit for interfacing a device to a line-pair such as a Digital Addressable Lighting Interface (DALI) bus.

Generally, in one aspect, a device includes an interface circuit configured to interface a Digital Addressable Lighting Interface (DALI) bus with a controller. The interface circuit comprises: a diode bridge having polarity-independent input terminals configured to be coupled to the DALI bus, and further having a positive output terminal and a negative output terminal, wherein the diode bridge is configured to receive a receive signal from the DALI bus; a current limiter configured to limit an input current supplied to the interface circuit from the DALI bus via the diode bridge; an optocoupler having an input configured to receive the receive signal from the diode bridge and having an output configured to output the receive signal, galvanically isolated from the diode bridge and the DALI bus; a receive signal threshold reference device configured to set a threshold voltage for the optocoupler to respond to the receive signal; an optocoupler input current control device configured to divert at least a portion of the current supplied to the interface circuit from being supplied to an input of the optocoupler; an amplifier configured to receive the galvanically isolated receive signal from the optocoupler and to output a binary digital signal to the controller, via a low-pass filter (LPF); and a variable edge delay circuit configured to delay rising edges of the galvanically isolated receive signal substantially more than falling edges of the galvanically isolated receive signal, or to delay falling edges of the galvanically isolated receive signal substantially more than rising edges of the galvanically isolated receive signal.

In one embodiment, the variable edge delay circuit comprises a capacitor connected across an input of the amplifier that presents a different input resistance between the rising and falling binary signal input edges.

In another embodiment, the optocoupler input current control device comprises a resistor connected in a series current path between the positive output terminal and the negative output terminal of the diode bridge, in parallel with the input of the optocoupler.

In another embodiment, the current limiter comprises a first current limiter section and a second current limiter section, wherein the first current limiter section is configured to supply the input current from the DALI bus to the interface circuit, and wherein the second current limiter section is configured to return the input current from the interface circuit to the DALI bus via the diode bridge.

According to one optional feature of this embodiment, the first current limiter section comprises: a depletion mode N-channel field effect transistor (FET) having a source, drain, and gate, wherein the drain is connected to the positive output terminal of the diode bridge, and wherein the source is configured to output the input current to the interface circuit, and a first resistor connected between the gate and the source; and the second current limiter section comprises: a bipolar junction transistor having a collector, an emitter, and a base, wherein the emitter is connected to the negative output terminal of the diode bridge, and wherein the collector is connected to the gate of the FET, and a second resistor connected between the base and the emitter, wherein the bipolar junction transistor and the second resistor are configured to return the input current from the interface circuit to the diode bridge.

In another embodiment, the output of the optocoupler comprises an optocoupler transistor having a collector and an emitter, and wherein an input of the amplifier is connected to the collector of the optocoupler transistor.

According to one optional feature of this embodiment, the amplifier comprises an amplifier transistor having a base, an emitter, and a collector. The base of the amplifier transistor is connected to the collector of the optocoupler transistor. The variable edge delay circuit comprises a capacitor connected across the base and the emitter of the amplifier transistor.

According to another optional feature of this embodiment, the amplifier comprises a current mirror having a pair of matched transistors and at least one resistor in series with an emitter of at least one of the matched transistors.

In another embodiment, the output of the optocoupler comprises an optocoupler transistor having a collector and an emitter, and wherein an input of the amplifier is connected to the emitter of the optocoupler transistor.

In another embodiment, the receive signal is a binary digital signal having two states, and wherein the output of the optocoupler comprises an optocoupler transistor, and wherein the optocoupler transistor switches between a cut-off region and an active region in response to the two states of the receive signal.

In another embodiment, the receive signal threshold reference device comprises a Zener diode connected in a series path with the input of the optocoupler between the positive output terminal and the negative output terminal of the diode bridge.

Generally, in another aspect a device comprises an interface circuit configured to interface a Digital Addressable Lighting Interface (DALI) bus with a controller. The interface circuit comprises: a diode bridge having polarity-independent input terminals configured to be coupled to the DALI bus, and further having a positive output terminal and a negative output terminal, wherein the diode bridge is configured to receive a receive signal from the DALI bus; a galvanic isolation device having an input configured to receive the receive signal from the diode bridge and having an output configured to output the receive signal galvanically isolated from the diode bridge and the DALI bus; a receive signal threshold reference device configured to set a threshold voltage for the galvanic isolation device to respond to the receive signal; and a first duty cycle control device configured to adjust timing of rising edges of the galvanically isolated receive signal with respect to falling edges of the galvanically isolated receive signal.

In one embodiment, the galvanic isolation device comprises an optocoupler, and the first duty cycle control device controls a forward current through a diode of the optocoupler.

According to one optional feature of this embodiment the first duty cycle control device comprises a resistor configured to divert a selected portion of an input current, supplied to the interface circuit from the DALI bus via the diode bridge, from being supplied to the diode of the optocoupler.

According to one optional feature of this embodiment, the device includes an amplifier configured to receive the galvanically isolated receive signal from the optocoupler and to output a binary digital signal; and a second duty cycle control device configured to adjust timing of rising edges of the binary digital signal with respect to falling edges of the binary digital signal.

According to one optional feature of this embodiment, the second duty cycle control device comprises a capacitor connected across in parallel with an input of the amplifier that presents a different input resistance between the rising and falling binary signal input edges.

According to one optional feature of this embodiment, the second duty cycle control device is disposed at an output of the amplifier.

According to one optional feature of this embodiment, the optocoupler includes an optocoupler transistor, and wherein the optocoupler transistor switches between a cut-off region and an active region in response to the receive signal.

According to one optional feature of this embodiment, the amplifier switches between switches between a cut-off region and a saturated region in response to the galvanically isolated receive signal.

In another embodiment, the optocoupler includes an optocoupler transistor, and wherein the optocoupler transistor switches between a cut-off region and a saturated region in response to the receive signal.

As used herein for purposes of the present disclosure, the term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A "lighting driver" is used herein to refer to an apparatus that supplies electrical power to one or more light sources in a format to cause the light sources to emit light. In particular, a lighting driver may receive electrical power in a first format (e.g., AC Mains power; a fixed DC voltage; etc.) and supplies power in a second format that is tailored to the requirements of the light source(s) (e.g., LED light source(s)) that it drives.

The term "lighting module" is used herein to refer to a module, which may include a circuit board (e.g., a printed circuit board) having one or more light sources mounted thereon, as well as one or more associated electronic components, such as sensors, current sources, etc., and which is configured to be connected to a lighting driver. Such lighting modules may be plugged into slots in a lighting fixture, or a motherboard, on which the lighting driver may be provided. Such lighting modules may be plugged into slots in a lighting fixture, or a motherboard, on which the lighting driver may be provided.

The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry; a lighting driver) relating to the operation of the light source(s).

The terms "lighting fixture" and "luminaire" are used herein interchangeably to refer to an implementation or arrangement of one or more lighting units in a particular form factor, assembly, or package, and may be associated with (e.g., include, be coupled to and/or packaged together with) other components.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which may employ one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

As used herein, the term "approximately" means within a range of +/−5%. The term "substantially the same" means within a range of +/−10% of being exactly the same. The term "substantially equal to" means within a range of +/−10% of being exactly equal. The terms "substantially less than" and "substantially more than" mean at least 10% less than, and at least 10% more than, respectively.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
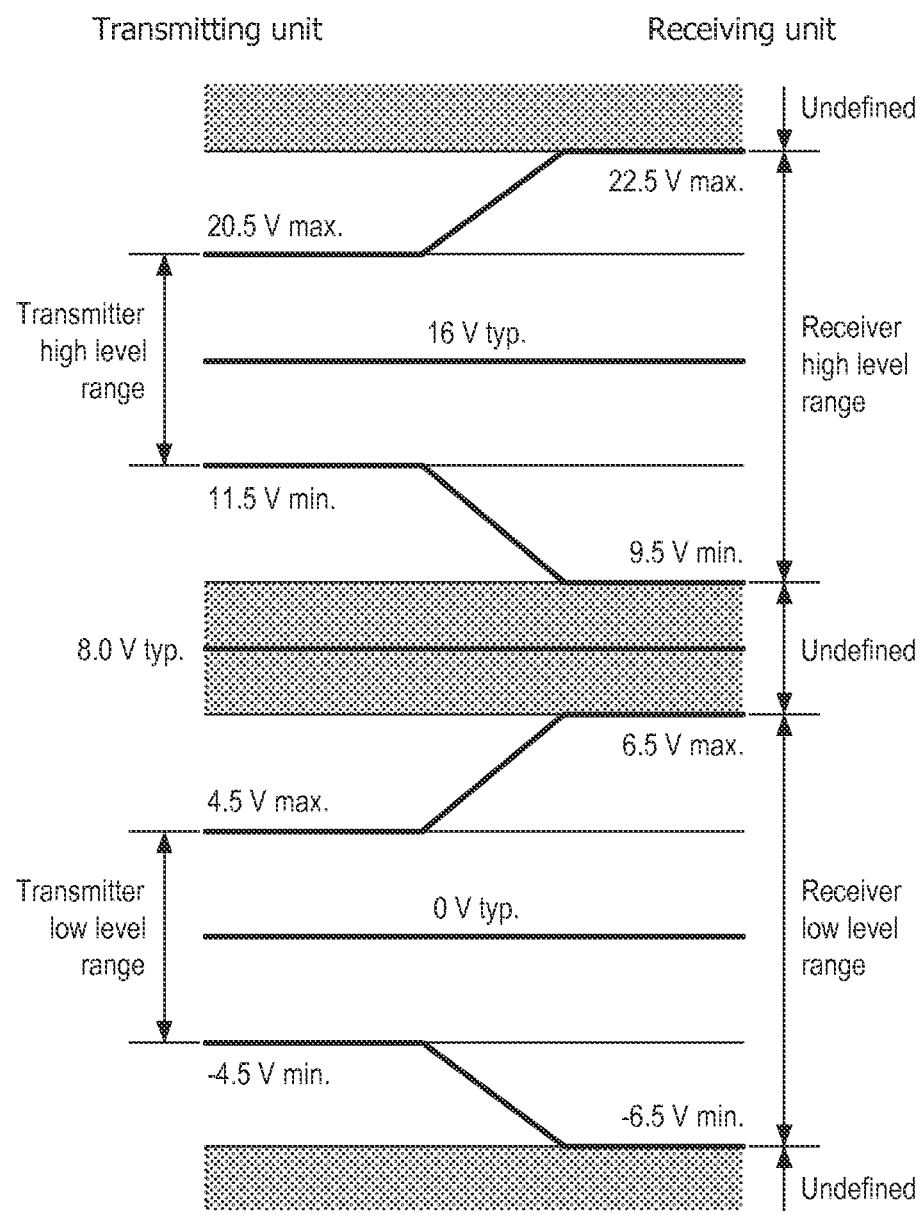
FIG. 1 illustrates voltage range relationships for the two differential voltage lines (one "line-pair") of a DALI bus at both the transmitting and the receiving units.

As discussed above, there is a general need for a communication interface circuit for a device which can ensure that the duty cycle of a signal received by the communication interface circuit and output to the rest of the device is maintained within a specified range—usually a specific range around an ideal 50% duty cycle.

Therefore, the present inventor has recognized and appreciated that it would be beneficial to provide a communication interface circuit which provides more flexible control of the duty cycle of a received signal. The present inventor has also recognized and appreciated that it would be further beneficial to provide a communication interface circuit which also provides more flexible control of the rise time and fall time of a received signal.

In view of the foregoing, various embodiments and implementations of the present invention are directed to a communication interface circuit and a device that includes a communication interface circuit. In particular, various embodiments and implementations of the present invention are directed to an interface circuit which includes a circuit for compensating for asymmetry in the duty cycle of a receive signal which may be introduced by the DALI loop itself and/or by other components of the interface circuit. Additionally, various embodiments and implementations of the present invention are directed to an interface circuit which also may independently adjust the rise time and fall time of edge transitions of a received signal.

As noted above, for optimal decoding it is desirable to have the duty cycle of a binary digital signal as close as possible to 50% when reaching the MCU. However, the DALI standard (IEC 62386-101) only imposes limits on the rise and fall transition times as well as the duty cycle (i.e., low and high durations) of the digital signal present on the DALI bus, and it is left to the interface to make sure that the duty cycle does not arrive overly distorted at the input of the MCU/decoder.

A DALI interface may employ a differential line pair for interfacing with the DALI bus. With respect to the reception of DALI signals via a DALI bus, after receiving the digital signal, via the differential line-pair, the DALI interface conditions a received signal from the DALI bus and conveys a corresponding binary digital signal to one or more components that use the binary digital signal (e.g., an MCU that also performs the necessary decoding of the binary digital signal) via a galvanic isolation means that provides a required galvanic isolation between the DALI bus and the MCU.

A DALI interface circuit may employ an optocoupler to provide the galvanic isolation between the DALI bus and the MCU.

An important parameter for an optocoupler is its transfer efficiency, usually measured in terms of its current transfer ratio (CTR) which is the ratio of the phototransistor collector current $I_C$ to the LED forward current $I_F$: $CTR=I_C/I_F$.

The present inventor has also realized and appreciated that the CTR of an optocoupler often is specified with a very wide tolerance range. Furthermore, the CTR can vary widely from one individual sample to another even among samples of the same optocoupler model and production lot. The CTR is also a function of temperature, of $I_C$ (or $I_F$), and is different when the output transistor of the optocoupler is operated in an active region (higher CTR) as compared to when the output transistor of the optocoupler is operated in a saturated region (lower CTR).

For example, the popular Toshiba TLP181 optocoupler has a published (data sheet) CTR range of 1:12 (50%-600%) for its generic version—and this is for a specific $I_F$=5 mA, $V_{CE}$=5V (active region operation), and $T_a$=25° C. Even if one goes to a tighter rank of the optocoupler (say, with a CTR range 1:3, or the tightest with a CTR range of 1:2), besides the price premium that must be paid, one still has to also account for the additional CTR range expansion due to the particular transistor current $I_C$ (or forward current $I_F$), the ambient temperature ($T_a$) range, and the particular region of operation (i.e., if the output transistor of the optocoupler is operated in an active region, the CTR is higher, as compared to when it is operated in a saturated region, characterized by a lower CTR). By way of example, applying the above considerations to the GR rank of the TLP181, having the published CTR range of 1:3 (100%-300%) for $I_F$=5 mA, $V_{CE}$=5V, and $T_a$=25° C., to ensure appropriate engineering margin over a temperature range of at least 60-80° C., the design should consider a conservative saturated CTR range of 20-220% and an active region CTR range of 35-350%. In conclusion, design of an interface circuit faces a serious challenge due to the potential wide range of CTRs from sample to sample and over the conditions in which the interface circuit will operate in the field.

The present inventor has also realized and appreciated that wide variations in the CTR of the optocoupler can make it difficult to ensure that a received signal is provided to the microcontroller or other decoding element of a DALI device with a desired duty cycle to ensure that the serial data conveyed by the received signal is accurately decoded in the presence of noise. In particular, the present inventor has realized and appreciated that when a receive signal is coupled through an optocoupler, then the delays applied by the optocoupler to the rising and falling edges are not symmetrical and are a function of the CTR of the optocoupler. Therefore, the optocoupler changes the duty cycle of the receive signal, and may cause the duty cycle of a receive signal to be asymmetrical and lie outside a desired range for proper operation of a subsequent data decoding circuit, such as a microcontroller. Furthermore, the degree of change in the duty cycle depends on the CTR, which as noted above can vary widely from device to device and over temperature and drive conditions.

As noted above, it is possible to obtain optocouplers whose CTRs are specified within a tighter tolerance, but this can add significantly to the cost of the interface circuit.

The present invention has additionally realized and appreciated that by adjusting the forward current $I_F$ supplied to the optocoupler, it is possible to compensate for variations in the CTR of the optocoupler.

The present inventor has further realized and appreciated that by adding an amplifier at the output of the optocoupler, it may be ensured that the binary digital signal output by the interface circuit (e.g., to an MCU) exhibits a full voltage swing for a wide range of optocoupler CTRs while allowing the optocoupler to operate in the active region where the CTR is larger.

The present inventor has further realized and appreciated that the addition of an amplifier at the output of the optocoupler can introduce increased duty cycle asymmetry in the receive signal. For example, in some embodiments the amplifier may have a variable (gain-dependent) falling or rising edge delay, typically due to the storage time of the output device (e.g., BJT transistor) coming out of saturation. Accordingly, the present inventor has appreciated that it may be desired to provide an interface circuit which includes a duty cycle control device which can compensate for this phenomenon and for other transition edge asymmetries in the interface circuit.

To address these issues, in some embodiments an interface circuit includes an input current control device which can set or adjust the forward current which is provided to the input of a galvanic isolation device (e.g., optocoupler) of the interface circuit. The input current control device may thereby control or adjust the slope of one of both of the falling and rising edges of the to compensate for duty cycle asymmetry introduced into the receive signal by one or more elements of interface circuit, in particular the galvanic isolation device.

Furthermore, in some embodiments an interface circuit further includes a variable edge delay circuit configured to delay rising edges of the receive signal output by the optocoupler substantially more than falling edges of receive signal output by the optocoupler, or to delay falling edges of the receive signal output by the optocoupler substantially more than rising edges of the receive signal output by the optocoupler. The variable edge delay circuit may operate as a duty cycle compensation circuit to compensate for duty cycle asymmetry introduced into the receive signal either by the DALI loop itself, or by one or more elements of the interface circuit, for example the optocoupler and/or amplifier as discussed above. The variable edge delay circuit may be disposed on an output side of the amplifier, but in a beneficial feature, the variable edge delay circuit may be disposed between the output of the optocoupler and the input of the amplifier so as to take advantage of the unidirectional device (semiconductor junction) at the input of the amplifier. For example, as explained above in some embodiments the amplifier may have a variable (gain-dependent) falling edge delay, and in that case the variable edge delay circuit may delay more the opposite edge at the input of the optocoupler.

In some embodiments, both the amplifier and the variable edge delay circuit may be omitted. Such embodiments may have advantages in terms of simplicity and reduced current consumption, but at the expense of requiring the optocoupler to have a more tightly specified CTR.

Figure 2:
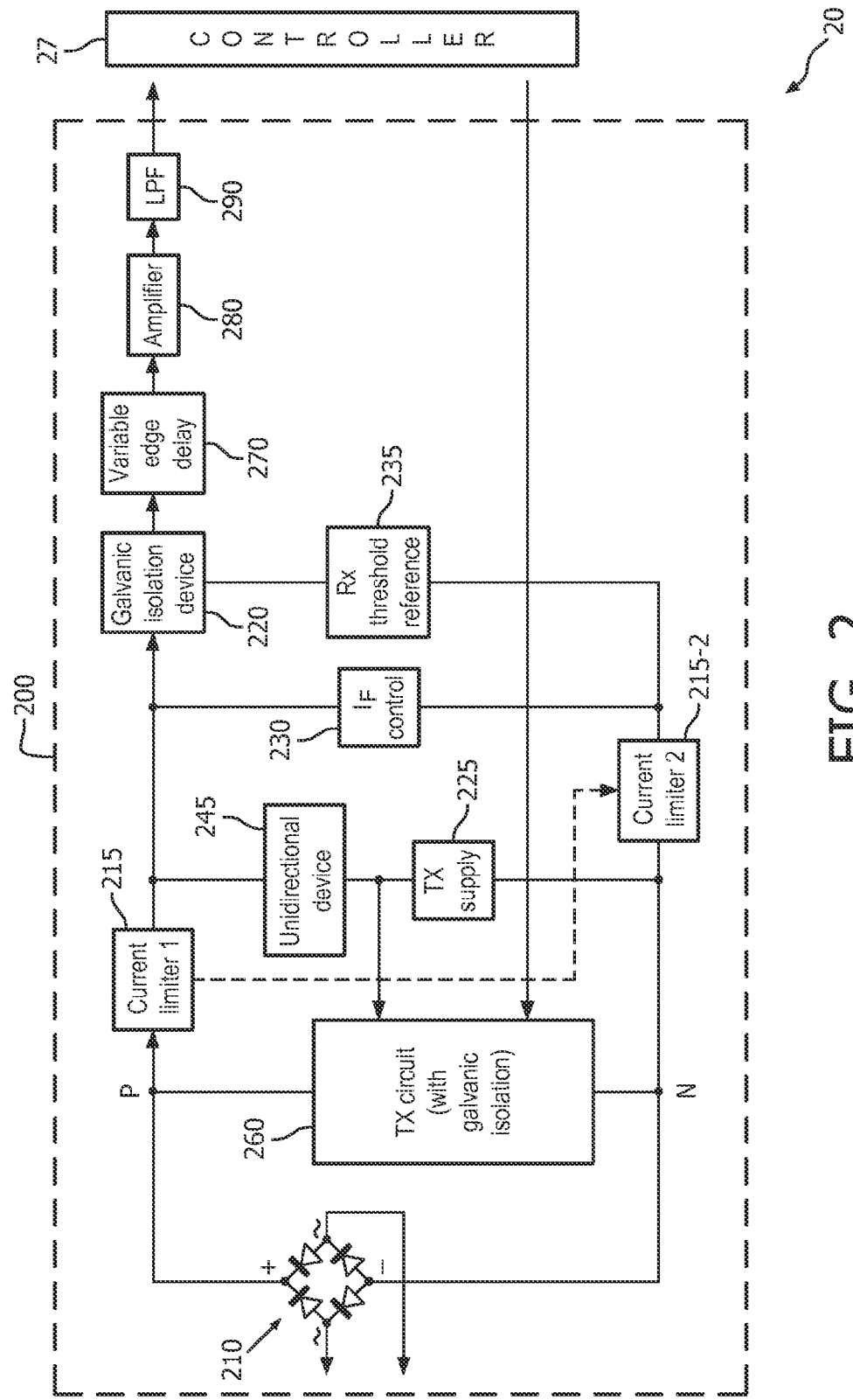
FIG. 2 is a functional block diagram of one embodiment of a device having an interface circuit for interfacing the device to a DALI bus.

To provide a concrete illustration of the inventive concepts disclosed in this patent application, FIG. 2 is a functional block diagram of one embodiment of a device 20 having an interface circuit 200 for interfacing the device to a DALI bus. It should be understood that a DALI device is being provided as an example application for the inventive concepts, but the inventive concepts may be applied to other communication interfaces, and particularly to interface circuits for interfacing devices to other line-pairs.

In the embodiment illustrated in FIG. 2, device 20 is a DALI device, and may include a controller 27 for controlling an operation of one or more lighting units or luminaires via signals communicated over the DALI bus. Each lighting unit or luminaire may include a lighting driver and/or a ballast, together with one or more light sources.

Interface circuit 200 includes: a diode bridge 210; a first current limiter section 215; a second current limiter section 215-2; a galvanic isolation device 220; an optocoupler input current control device 230; a transmit supply 225; a receive signal threshold reference device 235; a unidirectional device 245; a transmit circuit with galvanic isolation 260; a variable edge delay circuit 270; an amplifier 280; and a low pass filter 290.

Transmit circuit 260, transmit supply 225 and unidirectional device 245 operate to communicate a transmit signal from controller 27 onto the DALI bus via diode bridge 210. A variety of different circuit configurations and components may be employed to realize transmit circuit 260, transmit supply 225 and unidirectional device 245. Example embodiments of circuit configurations for realize transmit circuit 260, transmit supply 225 and unidirectional device 245 can be found in U.S. provisional patent application 61/623,198, "DIGITAL COMMUNICATION INTERFACE CIRCUIT FOR LINE-PAIR WITH INDIVIDUALLY ADJUSTABLE TRANSITION EDGES," filed on 12 Apr. 2012, and U.S. provisional patent application 61/673,780, "DIGITAL COMMUNICATION INTERFACE CIRCUIT FOR LINE-PAIR WITH DUTY CYCLE IMBALANCE COMPENSATION," filed on 20 Jul. 2012, both filed in the name of Stefan-Cristian Rezeanu. Further details of those circuits will not be discussed here.

Diode bridge 210 has a pair of polarity-independent input terminals coupled to a line-pair (e.g., a DALI bus), and also has a positive output terminal and a negative output terminal. Diode bridge 210 is configured to receive a receive signal from the DALI bus. As discussed above, the receive signal may comprise a serial data stream that employs a bi-phase coding, Manchester IEEE 802.3, in which the bit transitions occur between two states or voltage levels, which are typically 16 volts (H) and 0 volts (L).

First current limiter section 215 and second current limiter section 215-2 together comprise a current limiter which in operation limits an input current supplied to interface circuit 200 from the DALI bus via diode bridge 210. In general, the DALI specifications impose a requirement that the maximum idle (i.e., with a high voltage level on the DALI bus) current drawn by a slave device attached to a DALI bus be no more than 2 mA. The current limiter ensures that device 20 complies with this requirement. First current limiter section 215 supplies the input current from the DALI bus to interface circuit 200, and second current limiter section 215-2 returns the input current from interface circuit 200 to the DALI bus via diode bridge 210.

Additionally, in some cases interface circuit 200 may be required to withstand an input voltage as high as 305V to protect against a case where an installer mistakenly connects interface circuit 200 of device 20 to power-carrying wires of AC mains (possibly 277 Vac nominal) rather than to the DALI Bus. Accordingly, the current limiter may provide overvoltage protection for interface circuit 200 to withstand input voltages up to a specified value, for example 305V (approximately 277V+10%).

In some embodiments, second current limiter section 215-2 may be omitted. In that case, optocoupler input current control device 230 and receive signal threshold reference device 235 may be connected directly to the negative output terminal of diode bridge 210 to provide the return current of interface circuit 200 to diode bridge 210.

Galvanic isolation device 220 is operatively connected to diode bridge 210 and outputs a galvanically isolated receive signal received on the DALI bus via diode bridge 210. In device 20, galvanic isolation device 220 outputs the galvanically isolated receive signal to controller 27 of device 20 via variable edge delay circuit 270, amplifier 280, and low pass filter 290. Galvanic isolation device 220 provides an ability for interface circuit 200 to communicate the receive signal to controller 27 while maintaining galvanic isolation between the DALI bus on one side and controller 27 on the other side. In particular, galvanic isolation device 220 provides galvanic isolation between an input thereof and an output thereof.

Receive signal threshold reference device 235 sets a threshold voltage for galvanic isolation device 220 to respond to the receive signal, In particular, when the receive signal conforms to the characteristics illustrated in FIG. 1 above, then receive signal threshold reference device 235 sets a threshold for the galvanically isolated receive signal output by galvanic isolation device to transition between a high output level or state and a low output level or state when the received DALI loop signal transitions through a threshold voltage in a range between 6.5V and 9.5V, for example 8.0 V. In general, receive signal threshold reference device 235 sets the threshold in conjunction with other reference voltages—for example forward diode and/or junction voltages which may exist in various embodiments of galvanic isolation device 220 and/or current limiter 215 or 215-2, as will be discussed in greater detail below.

Optocoupler input current control device 230 controls or sets the forward current $I_F$ which is provided to the input of galvanic isolation device 220. In some embodiments, input current control device 230 may thereby control or adjust the slope of one or both of the falling and rising edges of the galvanically-isolated receive signal. Input current control device 230 may operate as a duty cycle compensation circuit to compensate for duty cycle asymmetry introduced into the receive signal either by the DALI loop itself, or by one or more elements of interface circuit 200, in particular galvanic isolation device 220. Further details of various embodiments of variable edge delay circuit 270 will be described below.

Amplifier 280 has an input for receiving the galvanically-isolated receive signal from galvanic isolation device 220, via variable edge delay circuit 270, and an output for providing a corresponding binary digital signal to the input of low pass filter 290. Beneficially, amplifier 280 is configured to ensure that the binary digital signal output by interface circuit 200 to controller 27 exhibits a full voltage swing over a wide range of different received signal levels, different environmental conditions, and different performance characteristics of various components in interface circuit 200.

Variable edge delay circuit 270 is configured to receive a galvanically-isolated receive signal from galvanic isolation device 220 and to delay rising edges of the galvanically-isolated receive signal substantially more than falling edges of the galvanically-isolated receive signal, or to delay falling edges of the galvanically-isolated receive signal substantially more than rising edges of the galvanically-isolated receive signal. Variable edge delay circuit 270 may operate as a duty cycle compensation circuit to compensate for duty cycle asymmetry introduced into the transmit signal either by the DALI loop itself, or by other elements of interface circuit 200, for example galvanic isolation device 220 and/or amplifier 280 as discussed above. Further details of various embodiments of variable edge delay circuit 270 will be described below.

Low pass filter 290 may reduce noise, particular high frequency noise, present in the binary digital signal output by amplifier 280.

In some embodiments, some elements of interface circuit 200 may be omitted, providing in general a trade-off between performance on one hand, and cost/complexity on the other hand. For example, an example embodiment will be described below where variable edge delay circuit 270 and amplifier 280 are omitted.

Furthermore, although interface circuit 200 illustrates variable edge delay circuit 270 being disposed at the input of amplifier 280, in general variable edge delay circuit 270 may be disposed upstream or downstream of amplifier 280 or even upstream of the galvanic isolation device 220.

Figure 3:
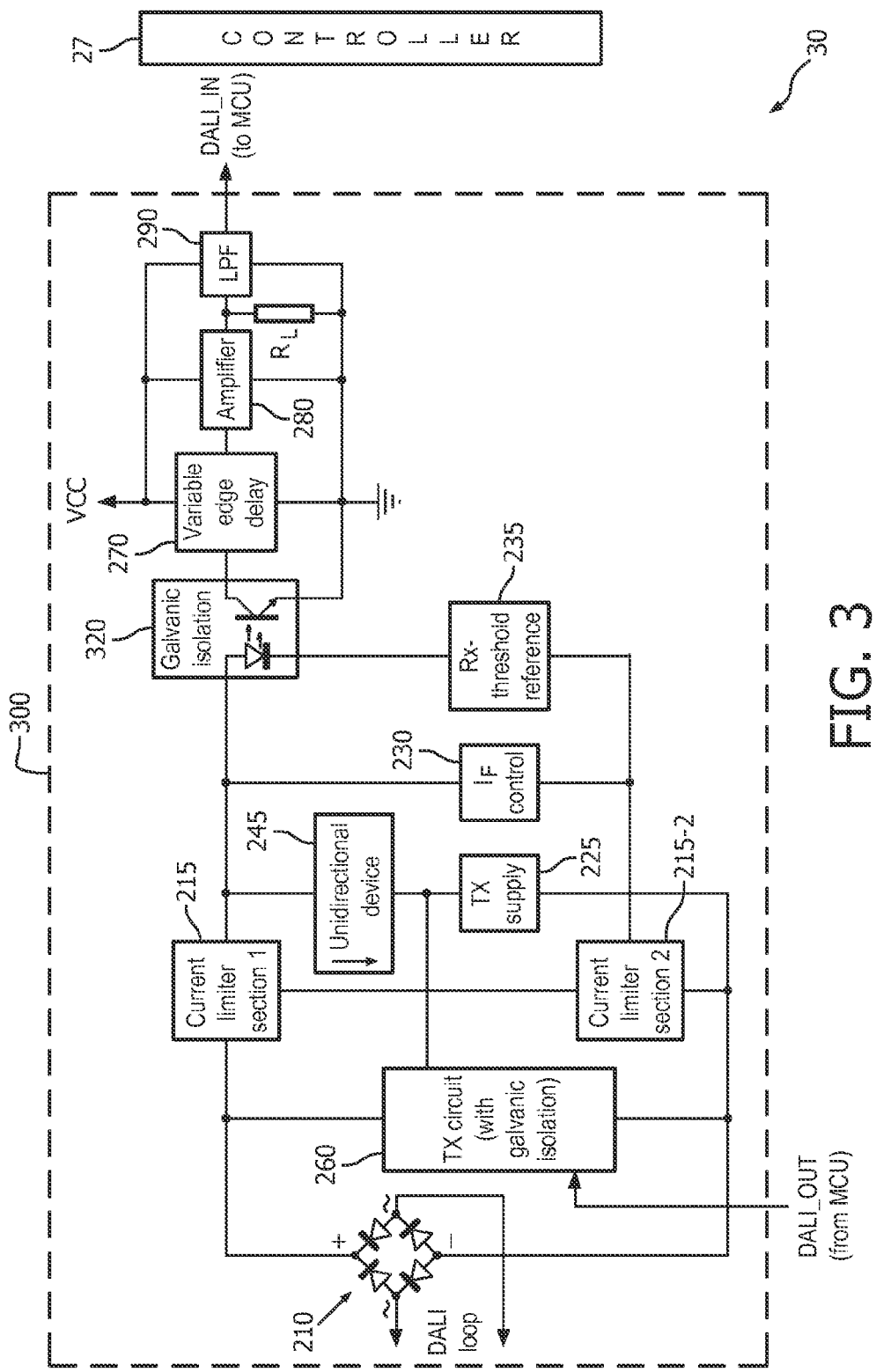
FIG. 3 is a detailed block diagram of one example embodiment of an interface circuit for interfacing a device to a DALI bus.

FIG. 3 is a more detailed block diagram of one example embodiment of a device 30 having an interface circuit 300 for interfacing device 30 to a DALI bus. In particular, interface circuit 300 may be one example embodiment of interface circuit 200.

In the example embodiment illustrated in FIG. 3, interface circuit 300 may comprise a DALI interface for interfacing a DALI bus to a controller (not shown in FIG. 3) for controlling an operation of one or more lighting units or luminaires via signals communicated over the DALI bus. Each lighting unit or luminaire may include a lighting driver and/or a ballast, together with one or more light sources.

Interface circuit 300 includes: diode bridge 210; first current limiter section 215; second current limiter section 215-2; an optocoupler 320; optocoupler input current control device 230; transmit supply 225; receive signal threshold reference device 235; unidirectional device 245; transmit circuit with galvanic isolation 260; variable edge delay circuit 270; amplifier 280; and low pass filter 290.

Interface circuit 300 is an embodiment of interface circuit 200 which includes both first and second current limiter sections 215 and 215-2, and where the galvanic isolation device is optocoupler 320.

Optocoupler 320 has: (1) an input comprising an input diode and first and second input terminals corresponding to the anode and cathode of the input diode; and (2) an output comprising an optocoupler transistor and first and second output terminals connected to the collector and emitter of the optocoupler transistor. The first input terminal of optocoupler 320 is operatively connected to diode bridge 210 via first current limiter section 215 to receive a receive signal, the second input terminal of optocoupler 320 is connected to receive signal threshold reference device 235, the emitter (second output terminal) of the optocoupler transistor is connected to ground, and the collector (first output terminal) is configured to output a galvanically isolated receive signal.

A portion of the input current received from the DALI bus via diode bridge 210 and output by first current limiter section 215 is provided to optocoupler 320 via the first input terminal. This current comprises the forward current $I_F$ through the diode of optocoupler 320.

Beneficially, optocoupler input current control device 230 controls or sets the amount of the forward current $I_F$ provided to the input/diode of optocoupler 320. As explained above, the current transfer ratio (CTR) of optocoupler 320 is a function of, among other things, the forward current $I_F$ provided to the input/diode of optocoupler 320. For example, when the optocoupler transistor of optocoupler 320 is operated in an active region, then the CTR of optocoupler 320 increases when the forward current $I_F$ through the diode of optocoupler 320 increases. Furthermore, when the optocoupler transistor of optocoupler 320 switches between a turned-OFF mode and an active region in response to the receive signal switching between the first level (e.g., 0 volts) and the second level (e.g., 16 volts), then a delay when the optocoupler transistor of optocoupler 320 turns ON in response to the receive signal changes as a function of the CTR.

Accordingly, by controlling, setting or adjusting the forward current $I_F$ through the input diode of optocoupler 320, the delay when the optocoupler transistor of optocoupler 320 turns ON in response to the receive signal may be adjusted, thereby also adjusting the duty cycle of the galvanically isolated receive signal output by optocoupler 320.

Meanwhile, optocoupler input current control device 230 is connected in parallel with the series combination of optocoupler 320 and receive signal threshold reference device 235. Since the input current to the parallel combination of (1) optocoupler input current control device 230; and (2) optocoupler 320/receive signal threshold reference device 235, is limited by the current limiter, then the forward current $I_F$ through the input diode of optocoupler 320 can be controlled, adjusted or set by controlling, adjusting, or setting the amount of current which control device 230 diverts.

In some embodiments, the amount of current diverted by optocoupler input current control device 230 may be set during the manufacture of interface circuit 300. In that way, variations in the CTR of optocoupler 320 from sample to sample, and interface circuit to interface circuit, may be compensated. More specifically, a nominal delay when the optocoupler transistor of optocoupler 320 turns ON may be set by adjusting optocoupler input current control device 230 during the manufacturing operation, thereby in turn adjusting the duty cycle of the galvanically isolated receive signal output by optocoupler 320 to be a desired nominal value, or more generally to adjust a duty cycle of the binary digital signal output by low pass filter 290 of interface circuit 200 to be a nominal value (e.g., 50%).

Taking this a step further, in some embodiments the amount of current diverted by optocoupler input current control device 230 may be changed dynamically during operation of interface 300 to compensate not only for variations in the CTR of optocoupler 320 from sample to sample and interface circuit to interface circuit, but also for variations in the CTR due to temperature, and/or to respond to variations in the voltage swing of the receive signal received from the DALI bus, thereby adjusting the duty cycle of the binary digital signal output by low pass filter 290.

Beneficially, the optocoupler transistor of optocoupler 320 is configured to switch between a turned-OFF mode and an active region in response to the receive signal switching between the first level (e.g., 0 volts) and the second level (e.g., 16 volts). In that case, amplifier 280 is configured to ensure a full range swing of the voltage on its output load ($R_L$) over the potentially wide range of the CTR for optocoupler 320. Beneficially, amplifier 280 is configured to switch between cut-OFF and saturation in response to the galvanically isolated receive signal. The swing amplitude is determined by the Vcc supply (usually a well regulated reference) and the output stage of the amplifier.

In some embodiments, amplifier 280 may have a variable (gain-dependent) falling (or rising, dependent on the output stage topology of the amplifier 280) edge delay when amplifier 280 is turned OFF. Beneficially, this may be compensated by a corresponding turn-ON delay via either or both of optocoupler input current control device 230 and variable edge delay circuit 270. The falling edge delay in amplifier 280 can be due to a physical phenomenon (e.g., by the storage time delay introduced by a saturated output PNP BJT of amplifier 280), while the turn-ON delay would accomplish the desired duty cycle compensation.

In some embodiments, variable edge delay circuit 270 compensates not only for the imbalance introduced by amplifier 280, but also for the output duty cycle asymmetry introduced by the rest of the circuit (upstream and downstream of optocoupler 320), including the DALI loop itself. The price to be paid for the compensation of the large CTR range of optocoupler 320 by amplifier 280 is the increased delay imbalance, due to physical switch time, in the output stage of amplifier 280. In some embodiments, this is also compensated for by optocoupler input current control device 230 and variable edge delay circuit 270, with variable edge delay circuit 270 performing a fine adjustment targeting the delay of a single transition. Therefore, it should be noted that in interface circuit 300, duty cycle imbalance compensation is performed via two separate mechanisms: (1) optocoupler input current control device 230 setting or controlling the input current $I_F$ provided to optocoupler 320; and (2) variable edge delay circuit 270 at the output side (downstream) of optocoupler 320.

Figure 4:
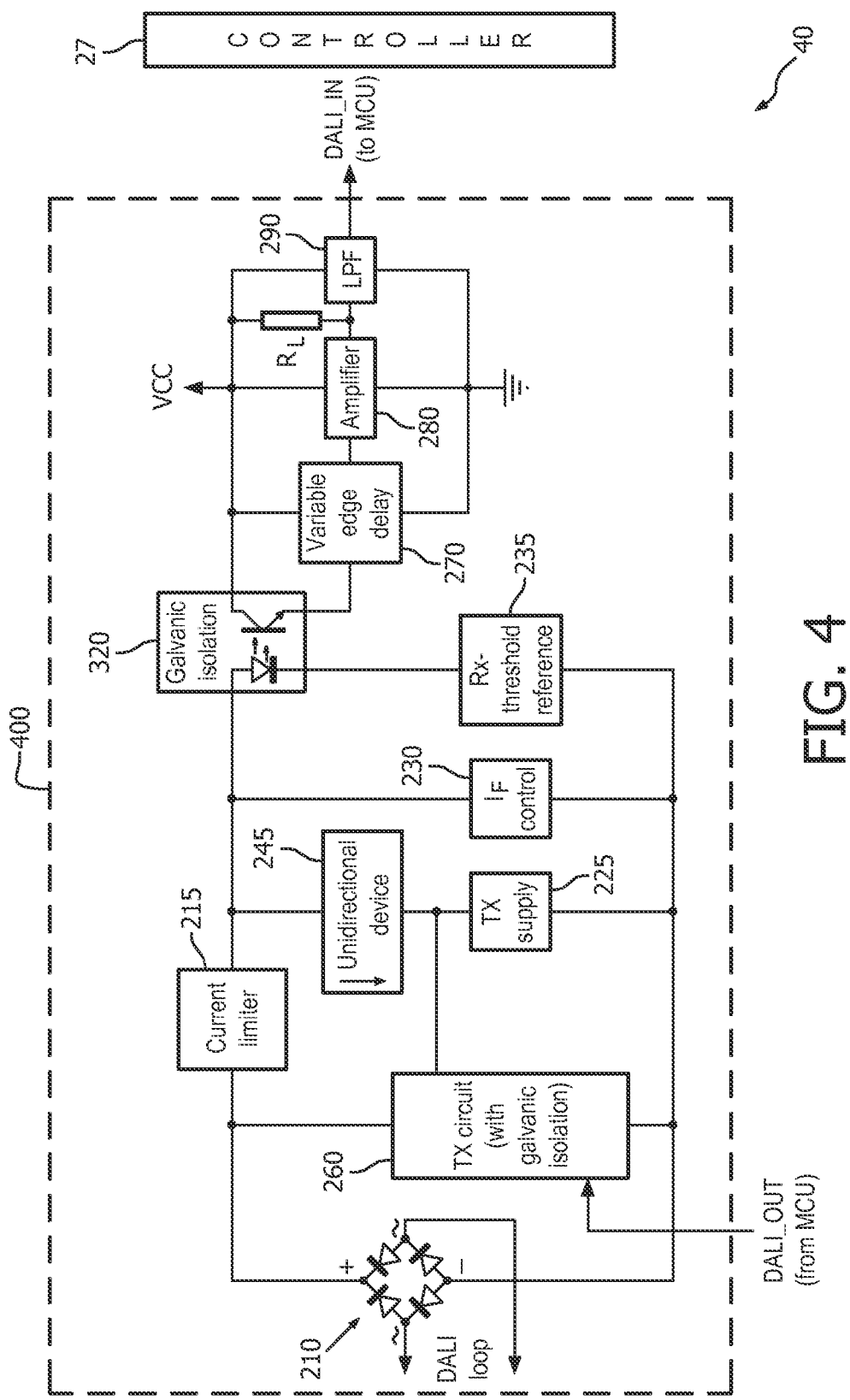
FIG. 4 is a detailed block diagram of another example embodiment of an interface circuit for interfacing a device to a DALI bus.

FIG. 4 is a circuit diagram of another example embodiment of a device 40 having an interface circuit 400 for interfacing device 40 to a DALI bus. In particular, interface circuit 400 may be one example embodiment of interface circuit 200.

For brevity, only the differences between interface circuit 400 and interface circuit 300 will be highlighted.

Interface circuit 400 exhibits two primary changes from interface circuit 300. First, interface circuit 400 omits second current limiter section 215-2, and only includes one current limiter section 215. Second, in interface circuit 400 variable edge delay circuit 270 and amplifier 280 are connected to and driven off of the emitter (second output terminal) of optocoupler 320, as opposed to the collector as in interface circuit 300. This may also induce the use of a different polarity of the binary digital output signal of the amplifier 280, as suggested by the connection of the load resistor ($R_L$) to a different voltage rail in interface circuit 400 than in interface circuit 300.

Although for brevity both of these changes are illustrated in one drawing in FIG. 4, it should be understood that these changes are independent and that other embodiments may include only one or the other of these changes with respect to interface circuit 300. That is, some embodiments may include first and second current limiter sections 215 and 215-2 while variable edge delay circuit 270 and amplifier 280 are connected to, and driven off of, the emitter (second output terminal) of optocoupler 320. Other embodiments may omit second current limiter section 215-2, and only include one current limiter section 215, while variable edge delay circuit 270 and amplifier 280 are connected to, and driven off of, the collector (first output terminal) of optocoupler 320.

Figure 5:
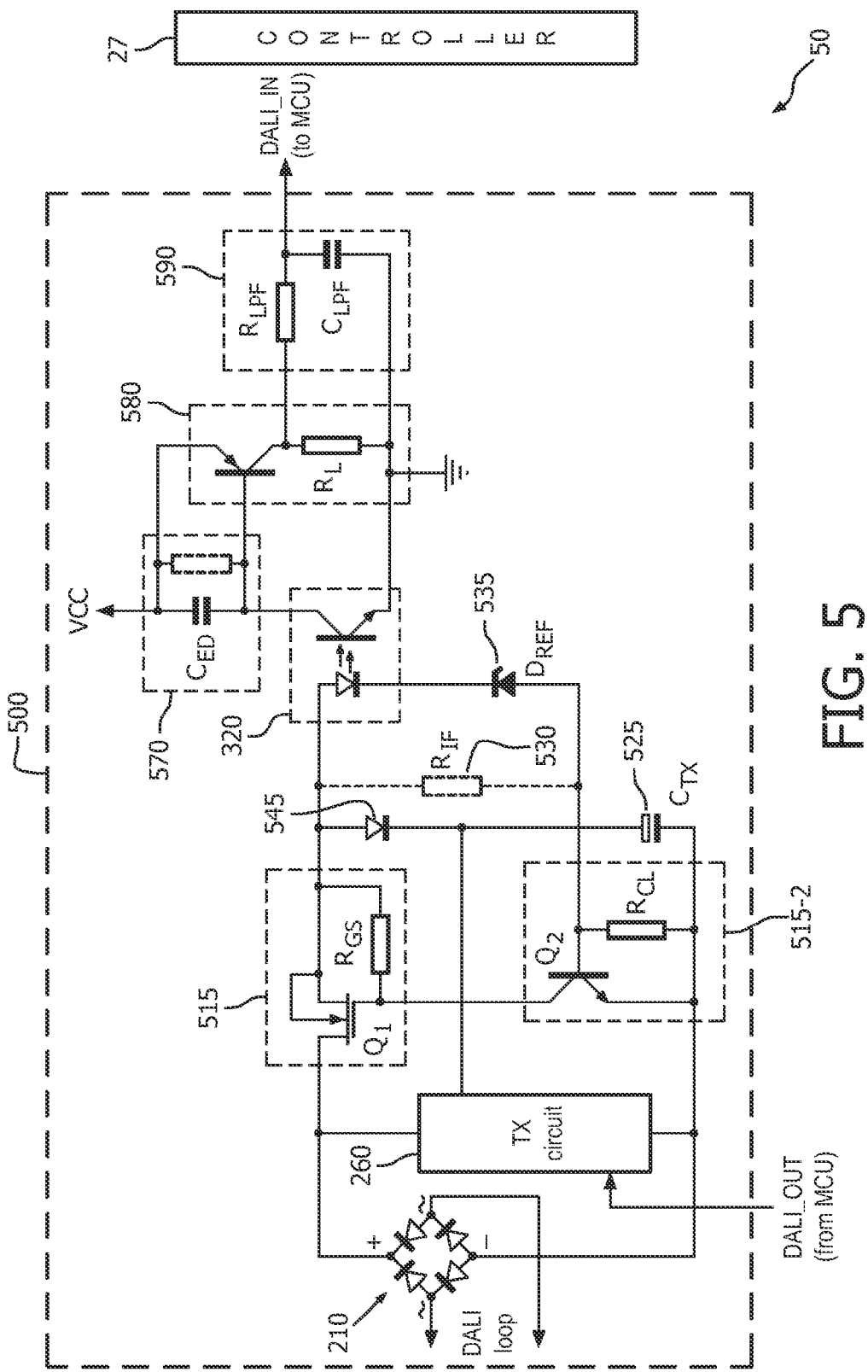
FIG. 5 is a circuit diagram of one example embodiment of an interface circuit for interfacing a device to a DALI bus.

FIG. 5 is a circuit diagram of one example embodiment of a device 50 having an interface circuit 500 for interfacing device 50 to a DALI bus. Interface circuit 500 includes: diode bridge 210; a current limiter comprising first current limiter section 515 and second current limiter section 515-2; optocoupler 320; input current control device 530; transmit supply 525; receive signal threshold reference device 535; unidirectional device 545; transmit circuit with galvanic isolation 260; variable edge delay circuit 570; amplifier 580; and low pass filter 590.

First current limiter section 515 comprises a depletion mode N-channel metal oxide semiconductor field effect transistor (MOSFET) Q1 and a gate-source resistor $R_{GS}$. Second current limiter section 515-2 comprises an NPN bipolar junction transistor (BJT) Q2 and a current limiting resistor $R_{CL}$. In operation, Q1 provided voltage breakdown protection, while $R_{GS}$ sets the current through the collector of Q2; it should be noted that the polarity of the voltage drop across $R_{GS}$ imposes the use of a depletion mode N-channel MOSFET for the simple implementation illustrated in FIG. 5. $R_{GS}$ is typically in the several tens of kΩ range, so most of the DALI bus current in the idle state will flow through $R_{CL}$, as well as the input diode of the optocoupler 320. In some embodiments, $R_{CL}$ may have a value in a range from 300-400Ω in order to limit the idle DALI bus current to a value lower than (but close to) the required 2 mA (per the DALI standard).

Unidirectional device 545 is a simple diode, which in series with $C_{TX}$ forming transmit supply 525, replenishes the charge of transmit supply 525 during the periods of time when transmit circuit 260 does not force a short on the DALI bus.

In interface circuit 500, optocoupler input current control device 530 is just a resistor $R_{IF}$ which simply shunts part of the DALI bus current, reducing the forward current $I_F$ through the input diode of optocoupler 320, which in turn reduces the CTR of optocoupler 320.

In some embodiments, the value of $R_{IF}$ may be individually selected (e.g., by blowing fuses in a resistor ladder) for each interface circuit 500 during the manufacture of interface circuit 500. In that way, variations in the CTR of optocoupler 320 from sample to sample, and interface circuit to interface circuit, may be compensated for. More specifically, a nominal delay when the optocoupler transistor of optocoupler 320 turns ON may be set by selecting a value for $R_{IF}$ during the manufacturing operation, thereby in turn adjusting the duty cycle of the galvanically isolated receive signal output by optocoupler 320 to be a desired nominal value, or more generally to adjust the duty cycle of the binary digital signal output by low pass filter 590 of interface circuit 500 to be a nominal value (e.g., 50%).

Taking this a step further, in some embodiments the value of $R_{IF}$ may be changed dynamically during operation of interface 500 to adjust the CTR of optocoupler 320 from sample to sample and interface circuit to interface circuit, and also to compensate for variations in the CTR due to temperature and/or other factors such as variations in the voltage swing of the receive signal received from the DALI bus. For example, in some embodiments temperature compensation may be achieved by including in interface circuit 500 a temperature measurement device and a look-up table which responds to the measured temperature, and which are used to dynamically switch in and out various resistances in a resistor ladder to select a particular value for $R_{IF}$ for a given sample of optocoupler 320 and the given temperature and thereby to adjust the duty cycle of the binary digital signal output by low pass filter 590 of interface circuit 500 to be a nominal value (e.g., 50%). In other embodiments, it is conceivable that the output duty cycle or some other parameter of interface circuit 500 may be measured during operation and a feedback loop may be employed to dynamically adjust the value of $R_{IF}$ to achieve a desired duty cycle (e.g., 50%) for the binary digital signal output by low pass filter 590 of interface circuit 500.

Receive signal threshold reference device 535 comprises a Zener diode $D_{REF}$. In some embodiments, the threshold voltage of Zener diode $D_{REF}$ may be in a range from 4.5-6.5V, which in combination with the input diode of optocoupler 320 and a $V_F$ (forward junction) voltage drop across the base-emitter junction of the Q2 NPN BJT of the current limiter may set the threshold voltage to be at a desired value with respect to the voltage swing of the receive signal on the DALI bus.

Amplifier 580 includes a PNP bipolar junction transistor (BJT) driving a load resistor $R_L$, which in some embodiments may have a value in the low kΩ range. In some embodiments, the voltage VCC may have a nominal value of 3.3V. In other embodiments, VCC may have a nominal value of 5V, which may ensure a better noise immunity on the signal path to the MCU, at the cost of a higher dissipated power.

Variable edge delay circuit 570 includes a capacitor $C_{ED}$ in parallel with the base-emitter junction of the PNP BJT of amplifier 580. In some embodiments, an optional resistor (drawn with a dashed line) may be provided in parallel with capacitor $C_{ED}$ and can be shared by variable edge delay circuit 570 and amplifier 580, depending on the desired value of the capacitor $C_{ED}$ and the amount of desired BJT current gain in order to ensure a full swing of the binary digital signal output by amplifier 580 on the load resistor $R_L$. In this case, the receive signal from the DALI bus would cause optocoupler 320 to typically switch between cut-OFF and the active region, which ensures that it operates at a higher CTR, while amplifier 580 is made to typically switch between cut-OFF and saturation. In some embodiments, $C_{ED}$ may have a value in a range of several nF. When the resistor is provided in parallel with $C_{ED}$, in some embodiments it may have a value in the low kΩ range.

Low pass filter 590 comprises a series resistor $R_{LPF}$ and a parallel capacitor $C_{LPF}$. Other configurations are possible, and in some embodiments $R_{LPF}$ may be omitted. In some embodiments, $C_{LPF}$ may have a value of several nF.

Interface circuit 500 provides an economical implementation when the potentially large edge-delay at the output of amplifier 580 is compensated by the proper choice of the $R_{IF}$ value and/or by the delay of the opposite edge in variable edge delay circuit 570. This is because one can make use of the unidirectional element (BJT input junction) inherently present there. However, this should not be seen as a limitation. In general, variable edge delay circuit 570 (duty cycle control device) can be present either upstream or downstream of amplifier 580, or even upstream of the galvanic isolation device 320.

It should be noted that in interface circuit 500, duty cycle imbalance compensation is performed via two separate mechanisms: (1) optocoupler input current control device 530 setting or controlling the input current provided to optocoupler 320; and (2) variable edge delay circuit 570 at the output side (downstream) of optocoupler 320.

Figure 6:
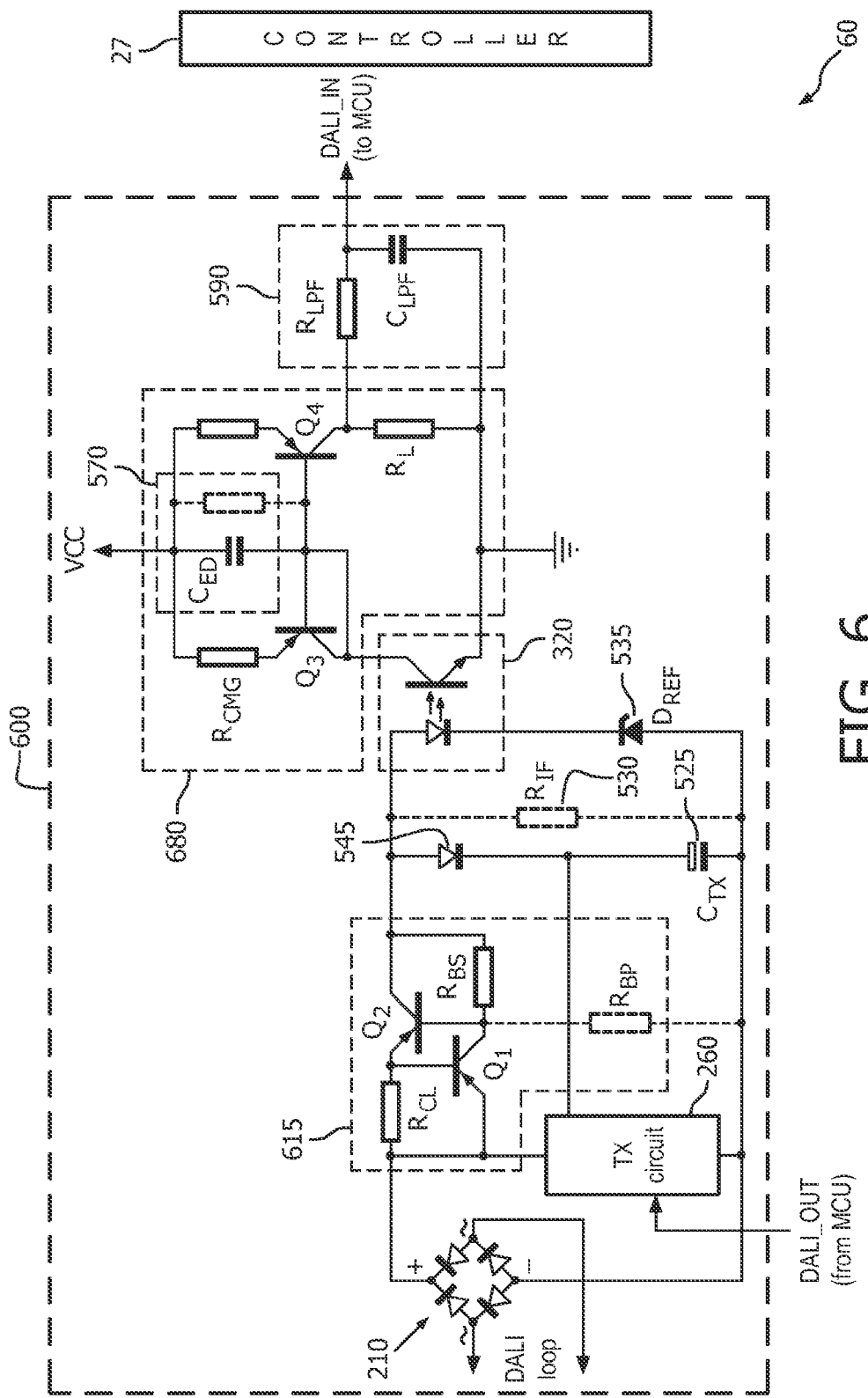
FIG. 6 is a circuit diagram of another example embodiment of an interface circuit for interfacing a device to a DALI bus.

FIG. 6 is a circuit diagram of another example embodiment of a device 60 having an interface circuit 600 for interfacing device 60 to a DALI bus. Interface circuit 600 includes: diode bridge 210; current limiter 615; optocoupler 320; optocoupler input current control device 530; transmit supply 525; receive signal threshold reference device 535; unidirectional device 545; transmit circuit with galvanic isolation 260; variable edge delay circuit 570; amplifier 680; and low pass filter 590.

For brevity, only the differences between interface circuit 600 and interface circuit 500 will be highlighted.

Interface circuit 600 exhibits two primary changes from interface circuit 500. First, interface circuit 600 replaces the current limiter of interface circuit 500 which has first and second current limiter sections 515 and 515-2, with a single current limiter 615. Second, interface circuit 600 employs amplifier 680 which employs a current mirror configuration.

Current limiter 615 comprises first and second PNP bipolar junction transistors (BJTs) Q1 and Q2, a current limiting resistor $R_{CL}$ and one of: (1) a base series $R_{BS}$; and (2) a base parallel resistor $R_{BP}$. The combination of Q1 and $R_{CL}$ set the maximum idle input current $I_{MAX}$ consumed by interface circuit 600 from the DALI bus, as: $I_{MAX}=0.6/R_{CL}$. In some embodiments, $R_{CL}$ may have a value in the 300-400Ω range, while $R_{BS}$ (or $R_{BP}$ in embodiment where $R_{BP}$ is used instead of $R_{BS}$) may, for example, have a value in a range from 100-200 kΩ. Normally, the voltage drop across Q1 ($V_{CE}$) will be about 1.2 volts. The transistor Q2 provides overvoltage protection for interface circuit 600, and in general may have a high breakdown voltage, for example 400-500 V.

Amplifier 680 comprises: master and slave PNP bipolar junction transistors (BJTs) Q3 and Q4 respectively; a current mirror gain resistor $R_{CMG}$ in the emitter leg of the master transistor Q3; and—optionally—a resistor in the emitter leg of the slave transistor Q4. Master transistor Q3 is connected in diode configuration. In some embodiments, $R_{CMG}$ may have a value in a range of 500-1000Ω, in which case the current mirror may have a current gain in a range of about 5-50 (if there is no resistor present in the emitter of Q4).

Again, typically the received signal from the DALI bus would have a voltage swing which causes optocoupler 320 to switch between cut-OFF and active region of operation (ensuring a higher CTR range), while the output of amplifier 680 (slave transistor Q4 of the current mirror) is made to switch between cut-OFF and saturation. Similarly to FIG. 5, a resistor (dashed line in FIG. 6) may optionally be placed in parallel with $C_{ED}$.

Although for brevity both of these changes are illustrated in one drawing in FIG. 6, it should be understood that these changes are independent and that other embodiments may include only one or the other of these changes with respect to interface circuit 500. That is, some embodiments may include first and second current limiter sections 515 and 515-2 while employing amplifier 680 having the current mirror configuration. Other embodiments replace first and second current limiter sections 515 and 515-2 with current limiter 615, but employ the single transistor amplifier 580 of interface circuit 500.

Figure 7:
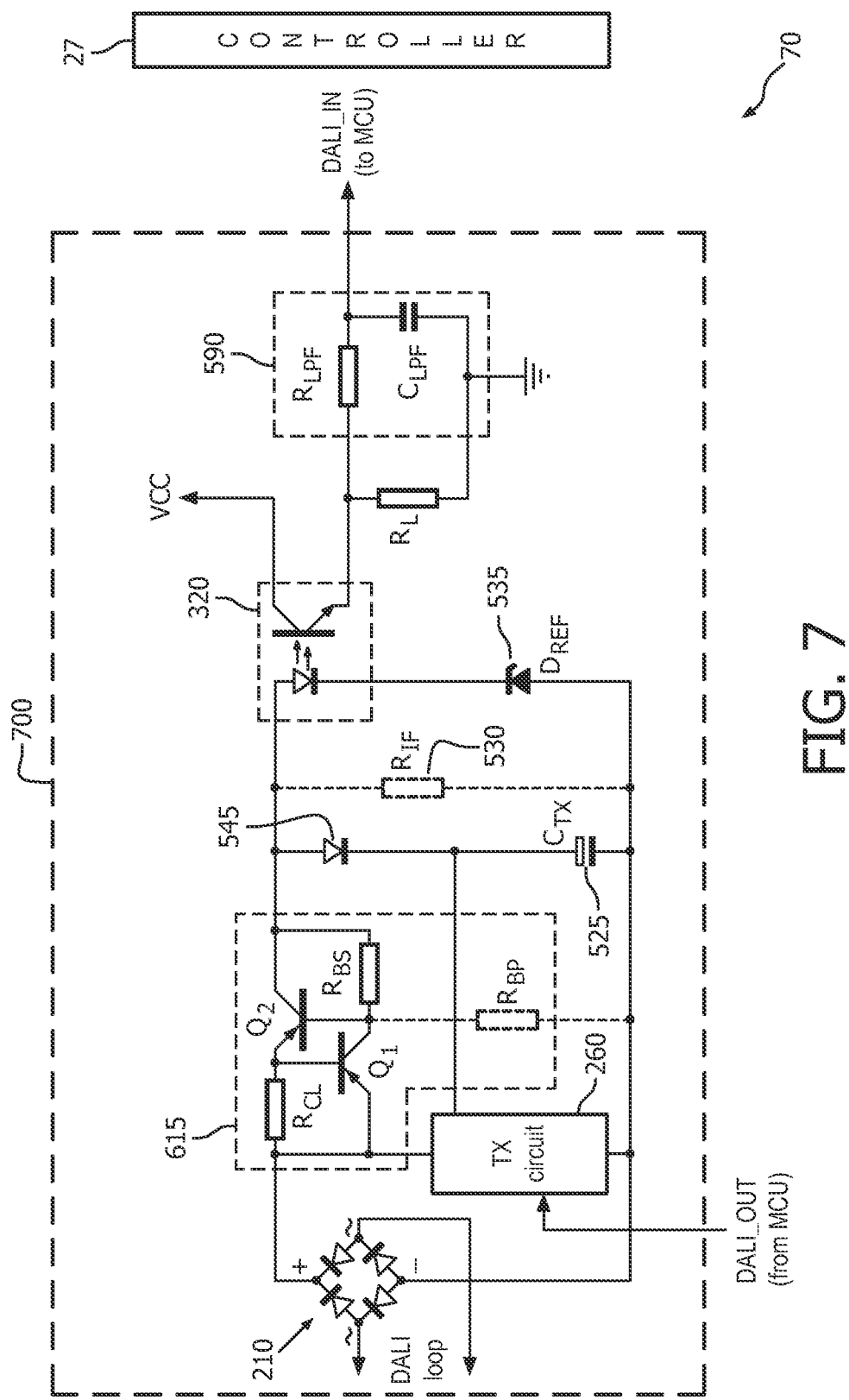
FIG. 7 is a circuit diagram of yet another example embodiment of an interface circuit for interfacing a device to a DALI bus.

FIG. 7 is a circuit diagram of yet another example embodiment of a device 70 having an interface circuit 700 for interfacing device 70 to a DALI bus. Interface circuit 700 is the same as interface circuit 600, except that variable edge delay circuit 570 and amplifier 680 are omitted. In that case, it is desirable that the receive signal from the DALI bus has a voltage swings which causes optocoupler 320 to switch between cut-OFF and saturation in order to provide a maximum voltage swing at the output of low pass filter 590. This operation of optocoupler 320 lowers the CTR range of optocoupler 320 compared to an operation that switches between cut-OFF and the active region.

Interface circuit 700 provides duty cycle control via the optocoupler input current control element 530 ($R_{IF}$). Namely, by increasing the value of $R_{IF}$ then the forward current $I_F$ through optocoupler 320 is increased, and assuming its value in the 1-2 mA range, this will cause a CTR increase for optocoupler 320. In turn, this will cause a faster rising edge in the galvanically isolated receive signal at the output of optocoupler 320, in conjunction with a delayed trailing edge, due to the increased storage time (caused by the deeper saturation of the optocoupler transistor). Obviously, by decreasing the value of $R_{IF}$, an opposite effect on the duty cycle may be achieved.

In comparison to interface circuits 500 and 600, interface circuit 700 has the advantage of simplicity, but at the price of reduced performance (i.e., it can accommodate a much reduced low end of CTR range for optocoupler 320 before starting to even possibly fail the duty cycle requirements presented in the DALI standard).

Other variations are possible.

It should be understood that although, to provide a concrete illustration, example embodiments have been described above in the context of a DALI device interfacing to a DALI bus, the concepts described above need not be so limited, and can be applied to other communication interfaces for other networks, systems, buses or loops, and in particular to a communication interface for a line-pair.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. It should also be understood that, unless clearly indicated to the contrary, in any methods claimed herein that include more than one step or act, the order of the steps or acts of the method is not necessarily limited to the order in which the steps or acts of the method are recited. Also, reference numerals appearing in the claims in parentheses, if any, are provided merely for convenience and should not be construed as limiting the claims in any way.

The invention claimed is:

1. A device, comprising:
   an interface circuit configured to interface a Digital Addressable Lighting Interface (DALI) bus with a controller, wherein the interface circuit comprises:
   a diode bridge having polarity-independent input terminals configured to be coupled to the DALI bus, and further having a positive output terminal and a negative output terminal, wherein the diode bridge is configured to receive a receive signal from the DALI bus;

a current limiter configured to limit an input current supplied to the interface circuit from DALI bus via the diode bridge;

an optocoupler having an input configured to receive the receive signal from the diode bridge and having an output configured to output the receive signal, galvanically isolated from the diode bridge and the DALI bus;

a receive signal threshold reference device configured to set a threshold voltage for the optocoupler to respond to the receive signal;

an optocoupler input current control device configured to divert at least a portion of the current supplied to the interface circuit from being supplied to an input of the optocoupler;

an amplifier configured to receive the galvanically isolated receive signal from the optocoupler and to output a binary digital signal;

a low-pass filter (LPF) configured to output the binary digital signal to the controller; and a variable edge delay circuit configured to delay rising edges of the galvanically isolated receive signal substantially more than falling edges of the galvanically isolated receive signal, or to delay falling edges of the galvanically isolated receive signal substantially more than rising edges of the galvanically isolated receive signal.

2. The device of claim 1, wherein the variable edge delay circuit comprises a capacitor connected across an input of the amplifier that presents a different input resistance between the rising and falling binary signal input edges.

3. The device of claim 1, wherein the optocoupler input current control device comprises a resistor connected in a series current path between the positive output terminal and the negative output terminal of the diode bridge, in parallel with the input of the optocoupler.

4. The device of claim 1, wherein the current limiter comprises a first current limiter section and a second current limiter section, wherein the first current limiter section is configured to supply the input current from the DALI bus to the interface circuit, and wherein the second current limiter section is configured to return the input current from the interface circuit to the DALI bus via the diode bridge.

5. The device of claim 4, wherein the first current limiter section comprises:

a depletion mode N-channel field effect transistor (FET) having a source, drain, and gate, wherein the drain is connected to the positive output terminal of the diode bridge, and wherein the source is configured to output the input current to the interface circuit, and a first resistor connected between the gate and the source; and wherein the second current limiter section comprises:

a bipolar junction transistor having a collector, an emitter, and a base, wherein the emitter is connected to the negative output terminal of the diode bridge, and wherein the collector is connected to the gate of the FET, and a second resistor connected between the base and the emitter, wherein the bipolar junction transistor and the second resistor are configured to return the input current from the interface circuit to the diode bridge.

6. The device of claim 1, wherein the output of the optocoupler comprises an optocoupler transistor having a collector and an emitter, and wherein an input of the amplifier is connected to the collector of the optocoupler transistor.

7. The device of claim 6, wherein the amplifier comprises an amplifier transistor having a base, an emitter, and a collector, wherein the base of the amplifier transistor is connected to the collector of the optocoupler transistor, and wherein the variable edge delay circuit comprises a capacitor connected across the base and the emitter of the amplifier transistor.

8. The device of claim 6, wherein the amplifier comprises a current mirror having a pair of matched transistors and at least one resistor in series with an emitter of at least one of the matched transistors.

9. The device of claim 1, wherein the output of the optocoupler comprises an optocoupler transistor having a collector and an emitter, and wherein an input of the amplifier is connected to the emitter of the optocoupler transistor.

10. The device of claim 1, wherein the receive signal is a binary digital signal having two states, and wherein the output of the optocoupler comprises an optocoupler transistor, and wherein the optocoupler transistor switches between a cut-off region and an active region in response to the two states of the receive signal.

11. The device of claim 1, wherein the receive signal threshold reference device comprises a Zener diode connected in a series path with the input of the optocoupler between the positive output terminal and the negative output terminal of the diode bridge.

12. A device, comprising:

an interface circuit configured to interface a Digital Addressable Lighting Interface (DALI) bus with a controller, wherein the interface circuit comprises:

a diode bridge having polarity-independent input terminals configured to be coupled to the DALI bus, and further having a positive output terminal and a negative output terminal, wherein the diode bridge is configured to receive a receive signal from the DALI bus;

a galvanic isolation device having an input configured to receive the receive signal from the diode bridge and having an output configured to output the receive signal galvanically isolated from the diode bridge and the DALI bus;

a receive signal threshold reference device configured to set a threshold voltage for the galvanic isolation device to respond to the receive signal; and a first duty cycle control device configured to adjust timing of rising edges of the galvanically isolated receive signal with respect to falling edges of the galvanically isolated receive signal.

13. The device of claim 12, wherein the galvanic isolation device comprises an optocoupler, and wherein the first duty cycle control device controls a forward current through a diode of the optocoupler.

14. The device of claim 13, wherein the first duty cycle control device comprises a resistor configured to divert a selected portion of an input current, supplied to the interface circuit from the DALI bus via the diode bridge, from being supplied to the diode of the optocoupler.

15. The device of claim 13, further comprising:

an amplifier configured to receive the galvanically isolated receive signal from the optocoupler and to output a binary digital signal; and a second duty cycle control device configured to adjust timing of rising edges of the binary digital signal with respect to falling edges of the binary digital signal.

16. The device of claim 15, wherein the second duty cycle control device comprises a capacitor connected across in parallel with an input of the amplifier that presents a different input resistance between the rising and falling binary signal input edges.

17. The device of claim 15, wherein the second duty cycle control device is disposed at an output of the amplifier.

18. The device of claim 15, wherein the optocoupler includes an optocoupler transistor, and wherein the optocoupler transistor switches between a cut-off region and an active region in response to the receive signal.

19. The device of claim 18, wherein the amplifier switches between switches between a cut-off region and a saturated region in response to the galvanically isolated receive signal.

20. The device of claim 12, wherein the optocoupler includes an optocoupler transistor, and wherein the optocoupler transistor switches between a cut-off region and a saturated region in response to the receive signal.

* * * * *